Aug. 19, 1941.    L. W. HART    2,253,123
MEAT TENDERIZING MACHINE
Filed Aug. 4, 1938    4 Sheets-Sheet 1

INVENTOR.
LEO W. HART
BY
ATTORNEY.

Aug. 19, 1941.    L. W. HART    2,253,123
MEAT TENDERIZING MACHINE
Filed Aug. 4, 1938    4 Sheets-Sheet 2
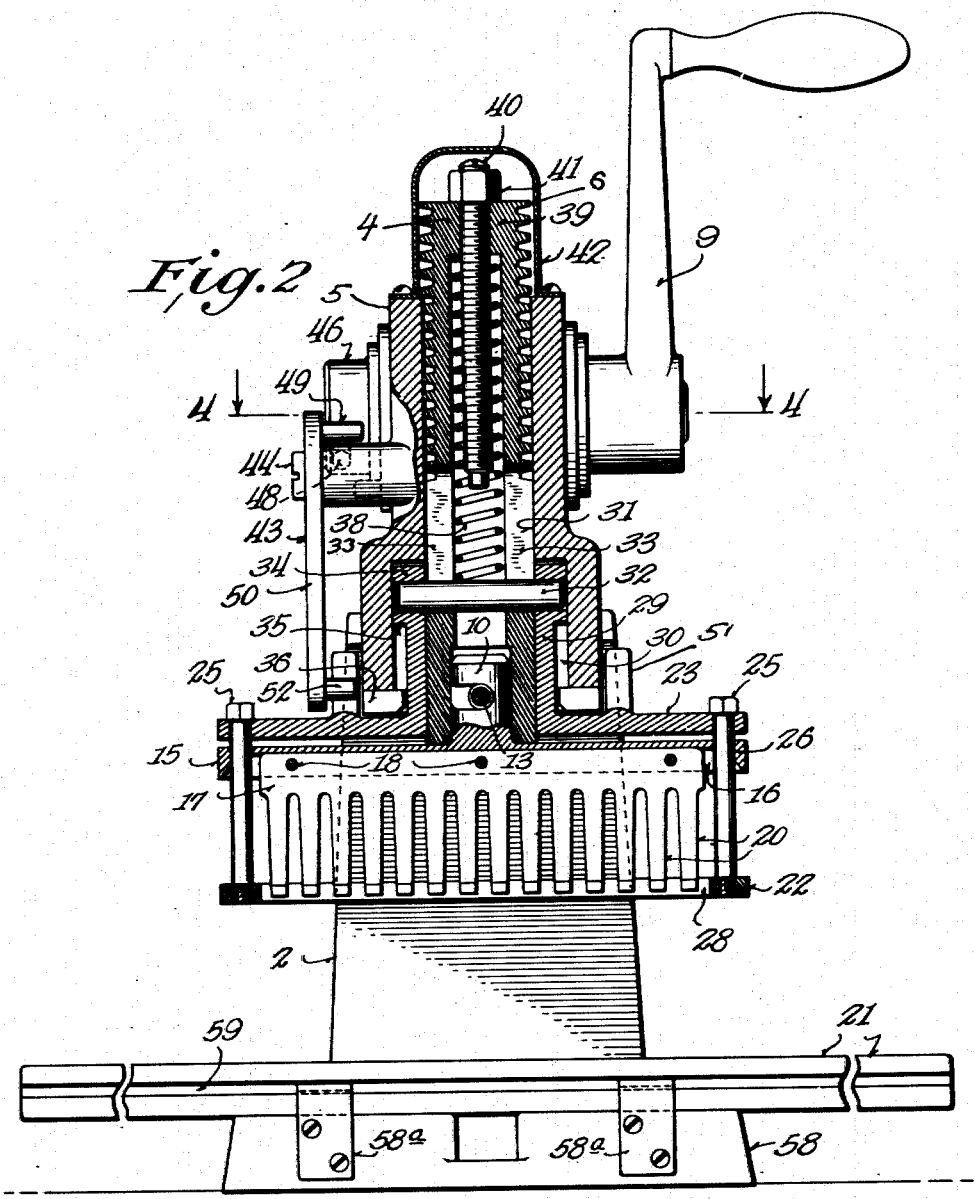
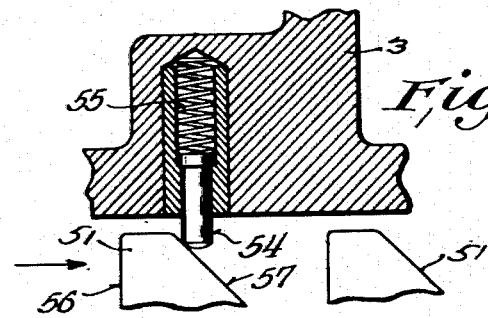
INVENTOR.
LEO W. HART
BY
ATTORNEY.

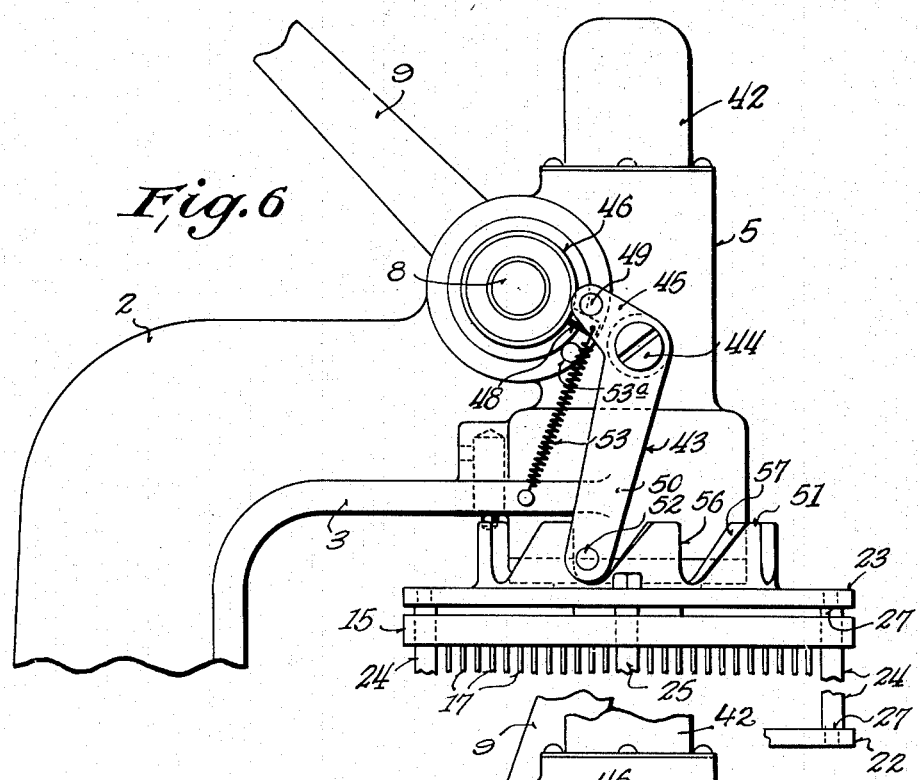
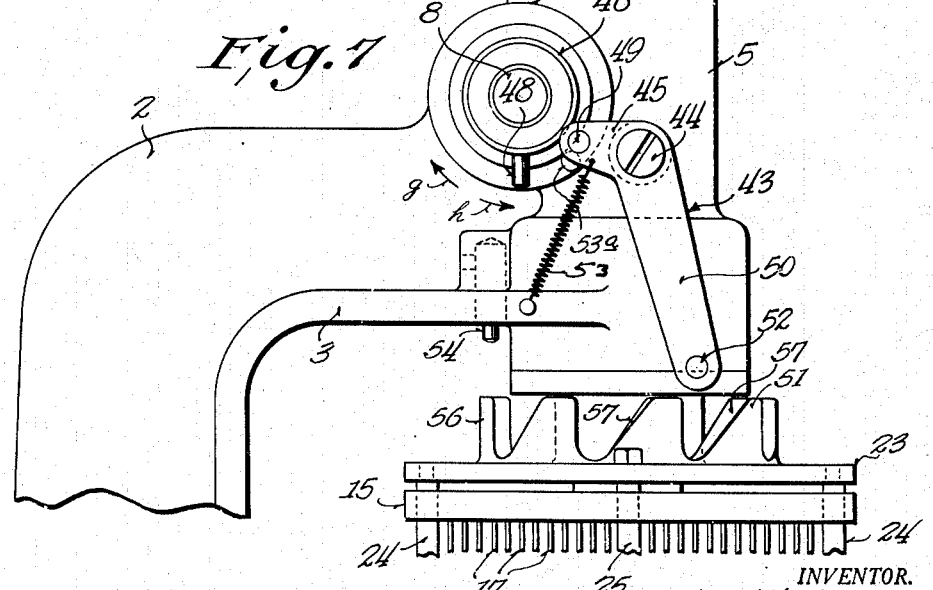

Patented Aug. 19, 1941

2,253,123

UNITED STATES PATENT OFFICE 2,253,123

MEAT TENDERIZING MACHINE

Leo W. Hart, Milwaukee, Wis., assignor to Butcher Boy Corporation, a corporation of Wisconsin Application August 4, 1938, Serial No. 222,987

9 Claims. (Cl. 17—25)

This invention relates to improvements in meat tenderizing machines.

The principal objects of my invention are as follows:

To provide a machine which is simple, yet sturdy and strong in construction;

To provide a machine which is adaptable for use in butcher shops, kitchens of hotels, restaurants, institutions and the like for tenderizing various cuts of meats to improve the edible quality thereof;

To provide a machine in which the knife assembly as a unit may be readily and easily applied to and be removed from the machine both in assembling the machine and when cleaning, resharpening or giving other desired attention to the knife assembly;

To provide a machine in which the knives of the knife assembly are in the form of blades separately removable from the blade supporting plate so that the knives may be readily replaced in case of breakage or wear or be resharpened without the necessity of replacing the whole knife head;

To provide a machine in which the stripper plate for the knives does not compress the meat to resist the cutting action of the cutters on the fibers of the meat;

To provide a machine in which the cutting ends of the knives are scabbarded by the stripper plate when the knives are retracted so as to avoid injury to the hand of the operator in case he reaches into the machine under the stripper plate to remove or otherwise handle the piece of meat below the plate;

To provide a machine having an automatic indexing mechanism for the knife assembly and thus avoid manual indexing as heretofore;

To provide a machine in which the indexing mechanism acts to turn the knife assembly on the up-stroke of the plunger and is automatically re-set on the down-stroke of the plunger;

To provide a machine in which the indexing mechanism is operated in the reciprocation of the plunger and thus require only a single handle member for giving movement to both the plunger and the indexing device;

To provide a machine in which the indexing mechanism turns the knife assembly through a predetermined angle about the axis of the plunger on each full up-stroke of the plunger and thus set the knives for entry into the meat to cut the fibers thereof over substantially the entire area of the meat; and To provide a machine in which the stroke of the plunger may be varied to compensate for any shortening of the knives on being resharpened and thus adjust the stroke of the plunger for entry of the knives into the meat to a substantially uniform depth at all times.

Other and further objects of my invention will appear from the following specification taken in connection with the accompanying drawings, in which—

Fig. 2 is a similar front elevational view of the machine;

Fig. 3 is a vertical sectional view with parts in elevation showing a stop device for the indexing mechanism;

Figs. 6 and 7 are fragmentary side elevational views showing the automatic indexing mechanism in its operating and re-set portions, respectively.

Figure 1:
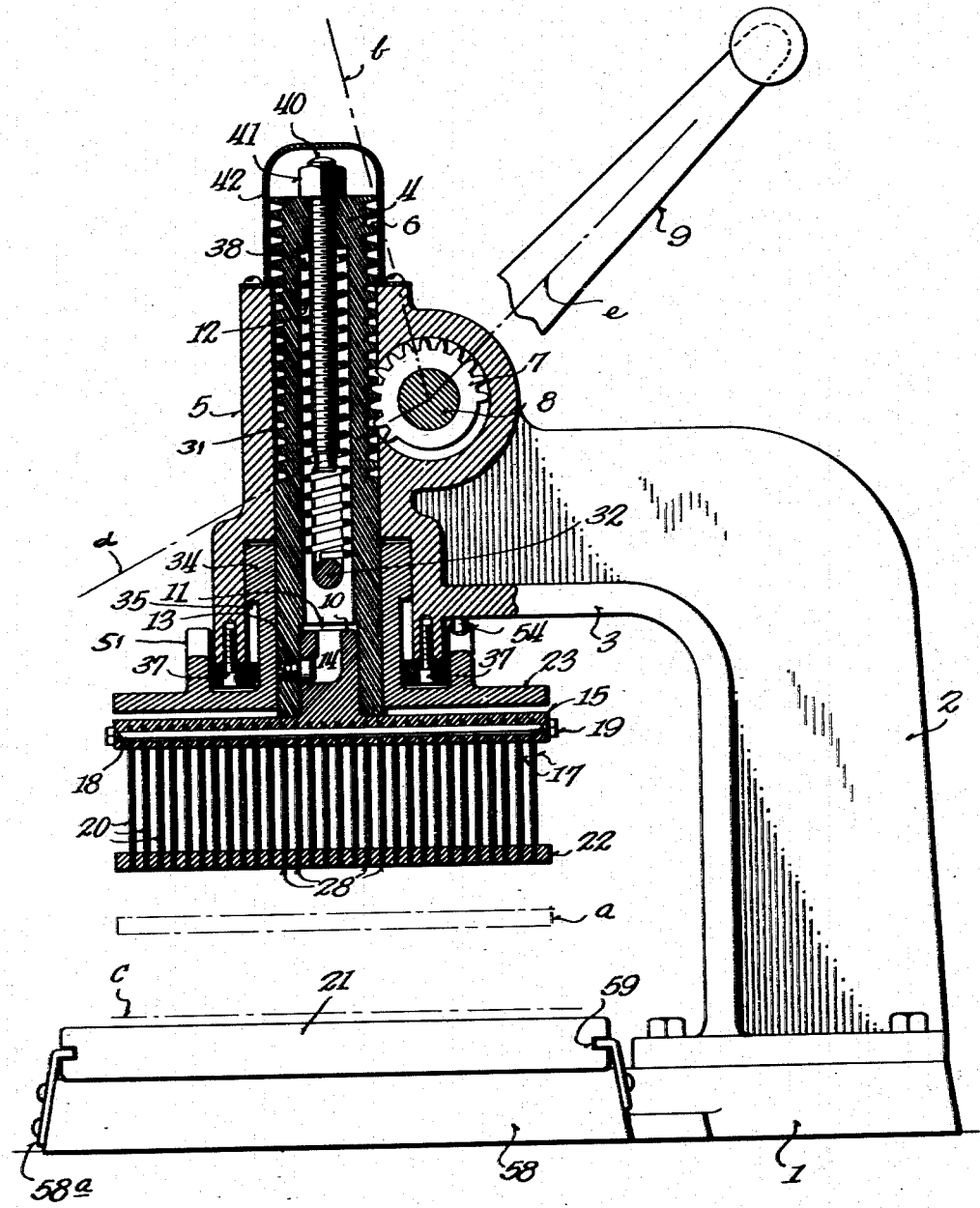
Fig. 1 is a side elevational view with parts in vertical section of my improved meat tenderizing machine.

As shown in the drawings, the machine has a base 1 and an upright standard 2 bolted or otherwise fixedly secured at its lower end to said base. The standard 2 has an over-hanging arm 3 at its upper end and this arm mounts a vertically movable plunger 4 in a housing 5 at the outer end of said arm. The plunger carries an annular rack 6 in mesh with a pinion 7 journaled in the housing 5 at one side of the plunger and keyed or otherwise fixed to a shaft 8 which extends through the pinion and is equipped at one end beyond the housing with a crank handle 9.

A knife assembly is connected to the lower end of the plunger 4 for vertical movement therewith in the up-and-down strokes of the plunger. The connection is a releasable one and in the embodiment shown includes an upright stud 10 centrally carried by the knife assembly and fitting in a socket 11 at the lower end of a bore 12 within the plunger. The stud 10 has a bayonet joint connection with the plunger, said joint comprising a projection 13 on the plunger engagable with a right angled slot 14 in the stud 10 as shown in Figs. 1 and 2. The knife assembly is interlocked with the plunger when the projection 13 is in the horizontal portion of the slot 14 as shown in Figs. 1 and 2. Turning the knife assembly relatively to the plunger to bring the projection 13 into the vertical portion of the slot permits removal of the knife assembly from the plunger in that the vertical portion of the slot extends through the upper end of the stud 10.

A stripper plate to be presently described must be out of the way when applying the knife assembly to and removing it from the plunger due to the fact that the stripper plate when in place precludes removal of the knife assembly from the plunger. This also applies when assembling the machine, the stripper plate being inserted in place after the attachment of the knife assembly to the plunger.

The knife assembly comprises a knife supporting plate 15 from which the stud 10 rises and said plate is provided on its underside with a plurality of parallel grooves 16, 16 to accommodate the requisite number of knife blades 17, 17 as shown in Figs. 1 and 2. These blades are secured in the grooves 16 by a number of bolts 18, 18 which pass through the plate 15 and the portions of the blades within the grooves 16. The bolts pass completely through the plate 16 from one side to the other and have their clamping nuts 19 accessible from the exterior of the plate for assembling and disassembling the blades.

Each knife blade 17 has the required number of cutting projections 20, 20, the lower ends of which are sharpened to enter the meat which is placed on a board 21 below the knife assembly. The projections 20 are of substantially the same length so as to enter to approximately the same depth into the meat on the board in the downward stroke of the plunger 4. With the blades 17 independently removable from the plate 15, it is unnecessary to replace the entire knife head when replacing one or more of the blades. Moreover, this arrangement allows for resharpening of any of the cutters 20 as the blades may be handled separately.

Figure 4:
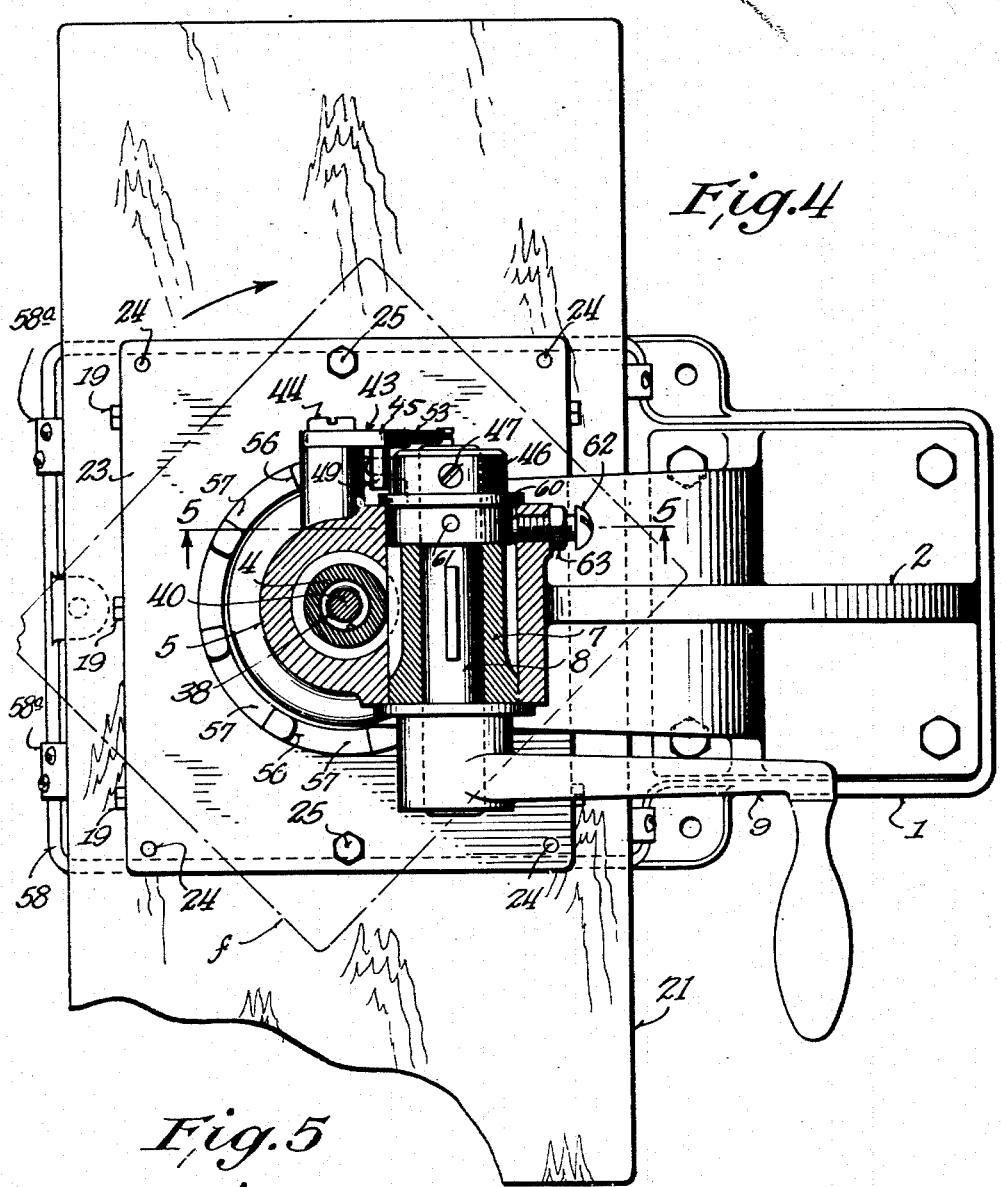
Fig. 4 is a horizontal sectional view taken on line 4—4 of Fig. 2 with parts in elevation and also showing in broken line an adjusted position of the knife assembly about the axis of the plunger.

The stripper plate herefore referred to is shown at 22. This plate in the embodiment illustrated is co-extensive with the plate 15 and an indexing plate 23 which is above the plate 15 as shown. This locates the plate 15 between the plates 22 and 23, the latter being connected in fixed vertically spaced relation by an arrangement of spacer and bolt elements 24, 25 which extend between the plates as shown. These elements extend through apertures 26 in the knife supporting plate 15 to hold it in place between the plates 22 and 23 and to guide the plate 15 in its up and down movements with the plunger 4 in the operation of the machine. The spacing elements have shoulders 27, 27 against which the bolt elements 25 clamp the plates in assembling the machine. The bolt elements 25, as shown in Fig. 2, have their lower ends in screw threaded engagement with the stripper plate 22 for this purpose. The plate 22 is slotted as at 28 to permit passage of the knife elements 20 in the operation of the machine, said slots having the same parallel arrangement and number as the knife blades. The stripper plate 22 acts to remove any meat which may adhere or cling to the cutters as the latter are moved upward with the plunger, the stripper plate remaining stationary at this time as will presently appear. The spacer elements 24 are disposed adjacent to the corners of the plates which they engage when these plates are square as shown in Fig. 4. The spacer and the bolts elements also hold the knife assembly against turning with respect to the plunger and thus the bayonet-joint connection remains interlocked. The shoulders referred to could be provided by the use of sleeves on the bolt and spacer elements if desired.

The index plate 23 has a cylindric upstanding central projection or boss 29 which extends into a similarly shaped recess 30 at the lower end of the housing 5. The recess 30 is a downward continuation of a bore 31 in the housing 5, the plunger 4 fitting and having sliding movement in said bore. A cross-pin 32 connects the boss 29 to the plunger 4, said pin extending through oppositely disposed elongated slots 33 in the plunger as shown in Fig. 2. The slots 33 extend axially of the plunger and permit movement of the plunger relatively to the index plate 23 in certain cycles of the operation of the machine as will presently appear. The boss 29 is hollow as shown in Fig. 2 to receive the lower end of the plunger, the latter extending to the plate 15 to embrace the stud 10 on said plate. The boss 29 at its upepr end at the pin 32 is enlarged as at 34 to fit against the cylindrical wall of the recess 30 and to provide a downwardly facing shoulder 35 which coacts with a stop 36 at the lower end of the recess 30 as shown in Fig. 2. This stop is preferably provided by the use of a ring secured to the lower end of the housing 5 by screws 37 as shown in Fig. 1. This ring 36 extends into the recess 30 and the portion of the boss 29 between the enlargement 34 and the plate 23 is reduced in diameter to pass freely through the ring.

The plunger 4 extends the length of the bore 31 in the housing 5 and is made hollow, except at its upper end, to accommodate a helical expansion spring 38. This spring seats at its upper end against the upper closed end 39 of the plunger and at its lower end against the pin 32. This spring aids in raising the plunger 4 in the upward movement of the knife assembly in the operation of the machine. Also located in the plunger is a screw element 40. The latter extends through the upper closed end 39 of the plunger and has threaded connection therewith so that the screw element 40 may be adjusted to compensate the stroke of the plunger to the length of the cutters 20 as will presently appear. A nut 41 is at the upper end of the screw element 40 to fix its adjustment, said nut 41 being exteriorly of the plunger for accessibility. A dust cap 42 is secured to the upper end of the housing 5 over the upper end of the plunger to enclose the screw element 40 and its nut 41 as shown in Figs. 1 and 2. The upper end of the screw element 40 may be kerfed as shown.

The indexing mechanism which is at one side of the housing 5 is preferably at the side of the housing opposite the handle 9 as shown. This mechanism comprises a bell-crank lever 43 fulcrumed between its ends at 44 on the housing 5 above the plate 23. The upper arm 45 of the lever extends towards the shaft 8 and partially overlaps a collar 46 fixed to the shaft 8 by a set screw 47 as shown in Fig. 4. Said collar carries a radial pin 48 which extends into the path of a lug 49 on the lever arm 45. Said lug extends laterally from said lever arm to be engaged by the pin 48 in the functioning of the machine. The lower arm 50 of the lever 43 is the longer of the two arms and extends towards the index plate 23 for co-action with a complement of teeth 51 on said plate as shown in Figs. 1, 4, 6 and 7. These teeth project upwardly from the plate 23 and are arranged in a circle about the same exteriorly of the housing 5. The lever arm 50 is disposed laterally of the teeth 51 and carries at its lower end a pin 52 which engages the teeth in an indexing action. A spring element 53 returns the lever arm 43 to its starting or re-set position. The lug 49 at the upper end of the lever strikes against a fixed stop 53a on the machine frame at this time as shown in Fig. 7. Said spring 53, as shown in Figs. 6 and 7, is connected at its upper end to the lever arm 45 and connected at its lower end to the stationary arm 3 of the machine frame. A stop 54 is carried by the arm 3 in the path of the teeth as shown. This stop may be of the fixed or rigid type or it may be spring biased as shown in Fig. 3. In the latter arrangement, the spring which urges the stop member 54 downwardly is marked 55 and is mounted in a suitable recess in the machine frame. The stop 54 prevents over-running of the knife assembly out of each angular position when indexed by the plunger as will later appear.

The teeth 51 have vertical driving faces 56 on one side and inclined or cam faces 57 on the opposite side as shown in Figs. 6 and 7. This enables the lever 43 to rotate the index plate 23 in one direction during an indexing action and ratchet over the teeth in a reverse direction. The stop 54 co-acts with the inclined faces 57 of the teeth 51 and thus may ratchet over said teeth should the force of the indexing action be sufficient at any time to raise the stop against its spring 55. This would avoid breakage of the parts when subjected to undue strain. Under ordinary circumstances, the indexing action is merely sufficient to turn the knife assembly against the stop 54 and thus a rigid stop may be used if desired.

The meat supporting board 21 is mounted on the base 1 beneath the plunger and knife assembly, said base having an extension 58 for the purpose as shown in Fig. 1. Brackets 58a are secured to this extension at the sides of the same and have their upper ends angled and extending into grooves 59 in the side edges of the board to retain it in sliding relation with respect to the base 1 as shown.

The operation of the machine shown and described is as follows. A slice or cut of meat to be tenderized is placed on the board 21 either directly beneath the knife assembly or placed on the board outside of the knife assembly and then moved under the same by sliding the board to bring about this relation. Usually the board is long enough to support a number of cuts of meat in spaced relation along the board and which cuts are moved under the knives one following the other by sliding the board. It is to be understood of course that the knives are in their raised positions as shown in Figs. 1, 2 and 6 before the meat is slid under the same. At this time the cutters 20 are scabbarded by the stripper plate 22 as shown. The other movable parts of the machine are in their uppermost positions at this time. When the meat is positioned, the operator swings the handle 9 downwardly from the position shown in full lines in Fig. 1. This starts the plunger on its downward stroke due to the drive of the pinion 7 on the rack 6. The latter is annular so that the plunger may be turned with respect to the pinion without releasing the mesh between them in the indexing of the knife assembly. In the initial or first part of the downward stroke of the plunger 4, the index plate 23 follows down with the plunger, the spring 38 keeping the pin 32 against the lower ends of the elongated slots 33. Were this spring omitted, which could be done if desired, the index plate would follow down with the plunger by gravity. The stripper plate 22 also lowers with the plunger, being fixedly connected to the index plate. These parts move downward in unison until the shoulder 35 carried by the index plate strikes the stop ring 36. This brings the parts to the dot and dash line position a shown in Fig. 1. The line b in Fig. 1 indicates the position of the handle 9 at this cycle of the movement. This stops the downward movement of the stripper plate 22 before it reaches the meat on the board 21 and thus the meat is not compressed by the stripper plate to resist the entry of the cutters 20 into the meat. Hence, the cutters may freely act on the meat to sever the fibers thereof.

A continued downward movement of the plunger projects the cutters 20 through the slots in the stripper plate 22 and causes the cutters to enter the meat on the board. The cutters enter the meat until stopped by the upper ends of the elongated slots 33 in the plunger contacting with the cross-pin 32 carried by the index plate 23. This pin is stationary at this time as the index plate is stopped by the ring 36. The plunger is now at the end of its downward stroke and the cutters 20 do not completely penetrate the meat, stopping short of the board as indicated by the dot and dash line c in Fig. 1. The position of the handle 9 at this time is indicated by the line d in Fig. 1. The starting position of the handle is indicated by the line e in Fig. 1.

The plunger is now raised on its upstroke by the handle 9. The cutters 20 are withdrawn from the meat and any of the meat clinging to the cutters will be stripped therefrom by the stripper plate 22 which is stationary at the position a in Fig. 1. Inasmuch as the meat is not compressed by the stripper plate, the cutters will leave the meat without much of an updrawing effect thereon, as the meat retains its soft and pliable character. This upward movement of the cutters without raising the stripper plate is due to the elongated slots 33. These slots provide a lost motion connection between the plunger and the stripper plate for this cycle of the movement and the stripper plate is not raised with the plunger until the lower ends of the slots pick up the pin 32. When this occurs the plunger raises the index and the stripper plates in unison with the knife assembly and carries all of the parts to their uppermost positions shown in Figs. 1, 2 and 6.

Before the plates reach the positions last mentioned, the indexing mechanism functions to give the knife assembly a predetermined turn about the axis of the plunger as indicated in the dash line position f in Fig. 4. In the down-stroke of the plunger the pin 48 on the collar 46 is turned away from and out of contact with the lug 49 on the lever arm 45. The direction of movement of the pin 48 is indicated at this time by the arrow g in Fig. 7. This frees the lever 43 of the holding action of the pin 48 and the spring 53 swings the lower end of the lever toward the right when the parts are viewed as in Fig. 6. Hence, the pin 52 at the lower end of the lever is pressed against the inclined surface 57 of the next adjacent tooth 51 and rides over said surface as the teeth are carried downwardly with the index plate 23. As soon as said tooth is carried below the pin 52, the spring 53 completes the swinging of the lever to the position shown in Fig. 7. The lug 49 on the lever comes to rest against its stop 53a and the lever 43 is positioned for its pin 52 to enter the space between the next two adjacent teeth on the next upward stroke of the plunger 4. On this up-stroke, the pin 52 first enters between the teeth on the plate 23, whereupon the pin 48, now moving in the direction of the arrow h in Fig. 7, contacts the lug 49 and swings the lower end of the lever 43 to the left when the parts are viewed as in Figs. 6 and 7. In this movement of the lever the pin 52 is pressed against the straight side of the engaged tooth 51 and rotates the index plate 23 clock-wise or toward the left a predetermined turn, whereupon the parts come to rest as shown in Fig. 6. The parts have now reached their uppermost positions, and further movement of the handle 9 in this direction is stopped by a cam-lock to be presently described. At this time, the tooth 51, previously acted on by the lever contacts the stop 54 and over-turning of the knife assembly is prevented.

The plunger 4 is now ready for another downward stroke and as the pin 48 leaves the lug 49 and the index plate 23 follows down with the plunger, the pin 52 at the lower end of the lever 43 riding along the inclined side of the next following tooth 51 and coming to rest in the position shown in Fig. 7 to again turn the index plate on the upstroke of the plunger. Hence, the index plate is automatically turned to a predetermined degree about the axis of the plunger on each full upstroke thereof and knife elements 20 are reset to enter the meat on the board at different angles about the axis of the plunger. This provides an effective tenderizing action on the meat in that the knife elements sever the fibers of the meat over substantially the entire area thereof. Hence, a piece of meat of even the poorest quality or grade is tenderized and rendered most edible. It may be remarked here that the tooth and lever arrangement of the indexing mechanism in the particular embodiment shown is designed to give the knife assembly one eighth of a turn about the axis of the plunger on each full up-stroke of the plunger.

Attention is also called to the fact that movement of the handle 9 in the up-stroke of the plunger may be stopped before the teeth 51 on the index plate 23 are brought into engagement with the pin at the lower end of the lever 43. The advantage of this is that the plunger may be given additional downward strokes to force the knives into the meat, if desired before indexing the knife assembly. These additional strokes may be necessary when operating on an unduly tough piece of meat or in case the meat happens to cling to the knives on the initial up-stroke thereof. Thus, the meat may be fully stripped from the knives by the stripper plate before allowing the indexing mechanism to function. This situation may be encountered when operating on an extremely thick slice of meat or when interconnecting several slices of meat of different kinds or flavors when laid one on the other.

Figure 5:
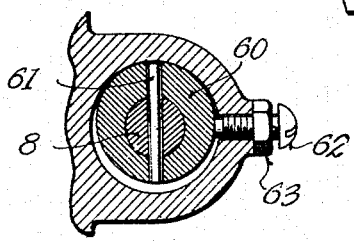
Fig. 5 is a fragmentary sectional view taken on line 5—5 of Fig. 4.

The cam lock referred to comprises a cam-ring or collar 60 fixed to the shaft 8 by a pin 61. A screw stud 62 is extended into the housing 5 at the periphery of the cam-collar 60 and engages the same as shown in Fig. 5. A lock-nut 63 is mounted on the stud 62 to hold the stud in its set position. The binding action of the stud on the collar 60 as the handle 9 is returned to and slightly beyond its completely raised position frictionally holds the handle raised. This binding action may be adjusted by setting the stud in tighter or looser relation to the eccentric cam surface of the collar. The cam-lock holds the plunger and the handle raised when the machine is not in use. This is a safety factor in that it requires an applied force to overcome the holding action of the lock and the spring 38, and thus the handle can not drop down or lower if accidentally struck.

The machine shown and described is simple, yet sturdy and strong in construction. It is effective in use and is of a character well adapting it to use in butcher shops, and in kitchens of hotels, restaurants, institutions and the like where meat is sold or served. The automatic indexing mechanism is an important feature of my invention in that it enables the knife assembly to be turned about the axis of the plunger in the regular operation of the machine without attention or manual movement by the operator as in other machines on the market. Hence, proper tenderizing of the meat being operated upon will be effected in the use of the machine, the indexing being accomplished in the regular up and down strokes of the plunger. In this connection it is pointed out that the entire action of the machine both with respect to the plunger and the indexing device is controlled through the actuator 9. This has the advantage of providing the machine with a single actuator and thus the operator is concerned with only one operating handle. The double action which the machine has in the reciprocation of the plunger is important in that the knife assembly can be raised and lowered with respect to the stripper plate to project the knives in a lowering action and strip and scabbard the knives in a raising action. Also, the double action, enables re-setting of the indexing mechanism on each downward stroke of the plunger.

As to the adjusting the stroke of the plunger, it will be noted that the screw element 40 is long enough to extend to upper ends of the slots 33 in the plunger 4. This screw when adjusted to have its lower end extending below the upper ends of the slots 33 as shown in Figs. 1 and 2 contacts the cross-pin 32 on the downward stroke of the plunger. In this way the screw element 40 limits the downward movement of the plunger and determines the extent of its downward stroke. When the knife elements 20 are shortened by re-sharpening, the screw element 40 is adjusted to set the plunger stroke in keeping with the length of the cutters.

The details of construction and arrangement of parts shown and described may be variously changed and modified without departing from the spirit and scope of my invention, except as pointed out in the annexed claims.

I claim as my invention:

1. In combination in a meat tenderizing machine, a machine frame, a meat support and a plunger respectively carried by said frame, said plunger being reciprocably mounted in the frame above the meat support, a rotatably mounted knife assembly movable by the plunger toward and from the meat support, an actuator for reciprocating the plunger, a complement of teeth on the knife assembly about the axis of the plunger, a bell-crank lever fulcrumed on the machine frame between the actuator and the knife assembly and having one end engageable by the actuator and the other end engageable with said teeth for automatically indexing the knife assembly about the axis of the plunger in the reciprocation of the plunger in one direction, and means for re-setting the lever with respect to the teeth in the reciprocation of the plunger by the actuator in the opposite direction.

2. In combination in a meat tenderizing machine, a machine frame, a meat support and a plunger respectively carried by said frame, said plunger being reciprocably mounted in the frame above the meat support, a rotatably mounted knife assembly movable by the plunger towards and from the meat support, an actuator for reciprocating the plunger, a complement of teeth on the knife assembly about the axis of the plunger, a bell-crank lever fulcrumed on the machine frame between the actuator and the knife assembly and having one end engageable by the actuator and the other end engageable with said teeth for automatically indexing the knife assembly about the axis of the plunger in the up-stroke thereof by the actuator, and means for resetting the lever with respect to said teeth on the down stroke of the plunger by the actuator, said teeth having driving faces on one side for engagement by the lever when indexing the knife assembly and inclined faces on the other side for the release of the lever when re-setting the same.

3. In combination in a meat tenderizing machine, a machine frame, a meat support and a plunger respectively carried by said frame, said plunger being reciprocably mounted in the frame above the meat support, a knife assembly movable by the plunger towards and from the meat support, means for reciprocating the plunger, a stripper plate for the knife assembly and movable therewith in the reciprocation of the plunger, and a stop for limiting the downward movement of the stripper plate short of the full downward stroke of the plunger, said stop being located between the stripper plate and the actuating means for the plunger.

4. In combination in a meat tenderizing machine, a machine frame, a meat support and a plunger respectively carried by said frame, said plunger being reciprocably mounted in the frame above the meat support, a knife assembly movable by the plunger towards and from the meat support, means for reciprocating the plunger, a stripper plate for the knife assembly, a pin and slot connection between the stripper plate and the plunger, said slot being elongated axially of the plunger to provide for relative movement between the plunger and the stripper plate in the reciprocation of the plunger, and a stop to limit the downward movement of the stripper plate with the plunger short of the full downward stroke of the knife assembly with the plunger.

5. In combination in a meat tenderizing machine, a machine frame, a meat support and a plunger respectively carried by said frame, said plunger being reciprocably mounted in a bore in the machine frame above the meat support, a knife assembly movable by the plunger towards and from the meat support, means for reciprocating the plunger, a stripper plate for the knife assembly, a boss movable with the stripper plate and extending into said bore about the plunger, said boss being slidably mounted in said bore and having a downwardly facing shoulder adjacent its upper end, a lost motion connection between the boss and the plunger for relative movement between them in the reciprocation of the plunger, and a stop on the machine frame at the lower end of said bore for contact with said shoulder to limit the downward movement of the stripper plate with the plunger.

6. In combination in a meat tenderizing machine, a machine frame, a meat support and a plunger respectively carried by said frame, said plunger being reciprocably mounted in a bore in the machine frame above the meat support, a knife assembly movable by the plunger towards and from the meat support, means for reciprocating the plunger, a stripper plate for the knife assembly, a boss movable with the stripper plate and extending into said bore about the plunger, said boss being slidably mounted in said bore and having a downwardly facing shoulder adjacent its upper end, a pin fixed to the boss adjacent to said shoulder and extending through an axially elongated slot in the plunger, and a stop-plate for the shoulder secured to the machine frame at the lower end of the bore.

7. In combination in a meat tenderizing machine, a machine frame, a meat support and a plunger respectively carried by said frame, said plunger being reciprocably mounted in said frame, a rotatably mounted knife assembly movable by the plunger towards and from the meat support, an index plate and a stripper plate associated with the knife assembly and movable therewith, said plates being secured in fixed spaced relation with the knife assembly between them, an actuator for reciprocating the plunger, a complement of teeth on the index plate about the plunger, a lever element fulcrumed on the machine frame and having one end engageable by the actuator and the other end engageable with the teeth on the index plate for automatically indexing the knife assembly about the axis of the plunger in the reciprocation thereof in one direction, and means for resetting the lever with respect to said teeth on the reciprocation of the plunger by the actuator in the opposite direction.

8. In combination in a meat tenderizing machine, a machine frame, a meat support and a plunger respectively carried by said frame, said plunger being reciprocably mounted in the frame above the meat support, an arrangement of superimposed plates at the lower end of the plunger, a series of knife blades secured to the intermediate plate and extendible through slots in the lowermost plate, the latter constituting the stripper plate for the knives, means securing the upper and the lowermost plates together in fixed spaced relation so that the intermediate plate may have movement with respect to the other plates in the reciprocation of the plunger, said means engaging the intermediate plate to hold the same in place with respect to the other plates, means connecting the intermediate plate to the plunger for movement therewith, and means providing a lost motion connection between the uppermost plate and the plunger whereby the intermediate plate may have relative movement with respect to the other plates.

9. In combination in a meat tenderizing machine, a machine frame, a meat support and a plunger respectively carried by said frame, said plunger being reciprocably mounted in the frame above the meat support, a knife assembly carried by the plunger and movable thereby towards and from the meat support, means for reciprocating the plunger, said means comprising a rack on the plunger and a pinion journaled in the machine frame and in mesh with said rack, a crank handle connected to the pinion for turning the same, and a cam lock associated with the pinion and co-acting therewith for holding the crank handle against accidental movement when in raised position.

LEO W. HART.